United States Patent

Krishnamurthy et al.

[11] Patent Number: 6,141,380
[45] Date of Patent: Oct. 31, 2000

[54] FRAME-LEVEL RATE CONTROL FOR VIDEO COMPRESSION

[75] Inventors: Ravi Krishnamurthy, Plainsboro; Sriram Sethuraman, Hightstown, both of N.J.

[73] Assignees: Sarnoff Corporation, Princeton, N.J.; LG Electronics, Inc., Seoul, Rep. of Korea

[21] Appl. No.: 09/196,821

[22] Filed: Nov. 20, 1998

Related U.S. Application Data

[60] Provisional application No. 60/100,939, Sep. 18, 1998.
[51] Int. Cl.[7] .................................................. H04N 7/50
[52] U.S. Cl. ............................ 375/240.02; 375/240.05; 375/240.07; 382/239
[58] Field of Search .................... 375/240.02, 240.03, 375/240.05, 240.07; 348/405, 419, 406.1, 405.1, 419.1; 382/239

[56] References Cited

U.S. PATENT DOCUMENTS

| | | | |
|---|---|---|---|
| 5,402,176 | 3/1995 | Murakami et al. | 348/405 |
| 5,442,401 | 8/1995 | Murakami et al. | 348/405 |
| 5,602,590 | 2/1997 | Numata et al. | 348/405 |
| 5,721,589 | 2/1998 | Murata | 348/405 |
| 5,757,434 | 5/1998 | Gunnewiek et al. | 348/405 |
| 6,026,190 | 2/2000 | Astle | 382/239 X |

FOREIGN PATENT DOCUMENTS

| | | | |
|---|---|---|---|
| 0 514 865 A2 | 11/1992 | European Pat. Off. | H04N 7/13 |
| 0 643 537 A2 | 3/1995 | European Pat. Off. | H04N 7/24 |

OTHER PUBLICATIONS

International Search Report PCT/US99/21841.
Hua L. et al.: "Experimental Investigation on MPEG-2 Based Video Coding at 22 MBPS" IEEE Transactions on Consumer Electronics, US, IEEE Inc., vol. 41, No. 3 Aug. 1995, pp. 615–619.

*Primary Examiner*—Howard Britton
*Attorney, Agent, or Firm*—William J. Burke

[57] ABSTRACT

The algorithm assumes a constant bit rate over a timing window of specified duration (e.g., a specified number of consecutive frames), where the current frame to be encoded lies in the interior of the timing window. A target bit rate for the current frame is initially selected by calculating the number of bits already used to encode other frames within the window and then assuming that the remaining available bits allocated to the timing window will be evenly distributed to the remaining unencoded frames in the timing window. The target bit rate may then be optionally adjusted based on scene content, encoder state, and buffer considerations. Through a combination of target bit allocation and frame skipping, spatial and temporal resolutions are maintained within acceptable ranges while meeting buffer delay constraints. The algorithm has also been extended to include PB frames in addition to P-only coders.

22 Claims, 2 Drawing Sheets

FRAME-LEVEL RATE CONTROL FOR VIDEO COMPRESSION

CROSS-REFERENCE TO RELATED APPLICATIONS

This application claims the benefit of the filing date of U.S. provisional application No. 0/100,939, filed on Sep. 18, 1998 as attorney docket no. SAR 12728P.

BACKGROUND OF THE INVENTION

1. Field of the Invention

The present invention relates to image processing, and, in particular, to video compression.

2. Description of the Related Art

The goal of video compression processing is to encode image data to reduce the number of bits used to represent a sequence of video images while maintaining an acceptable level of quality in the decoded video sequence. This goal is particularly important in certain applications, such as real-time video conferencing, where transmission bandwidth limitations may require careful control over the bit rate, that is, the number of bits used to encode each image in the video sequence. In order to satisfy the transmission and other processing requirements of a video conferencing system, it is often desirable to have a relatively steady flow of bits in the encoded video bitstream.

Achieving a relatively uniform bit rate can be very difficult, especially for video compression algorithms that encode different images within a video sequence using different compression techniques. Depending on the video compression algorithm, images may be designated as the following different types of frames for compression processing:

An intra (I) frame which is encoded using only intra-frame compression techniques, A predicted (P) frame which is encoded using inter-frame compression techniques based on a previous I or P frame, and which can itself be used as a reference frame to encode one or more other frames, A bidirectional (B) frame which is encoded using bidirectional inter-frame compression techniques based on a previous I or P frame and a subsequent I or P frame, and which cannot be used to encode another frame, and A PB frame which corresponds to two images—a P frame and a subsequent B frame—that are encoded as a single frame as in the H.263 video compression algorithm.

Depending on the actual image data to be encoded, these different types of frames typically require different number of bits to encode. For example, I frames generally require the greatest numbers of bits, while B frames generally require the least number of bits.

In a typical transform-based video compression algorithm, a block-based transform, such as a discrete cosine transform (DCT), is applied to blocks of image data corresponding to either pixel values or pixel differences generated, for example, based on a motion-compensated inter-frame differencing algorithm. The resulting transform coefficients for each block are then quantized for subsequent encoding (e.g., run-length encoding followed by variable-length encoding). The degree to which the transform coefficients are quantized (also referred to as the quantization level) directly affects both the number of bits used to represent the image data and the quality of the resulting decoded image. In general, higher quantization levels imply fewer bits and lower quality. As such, quantization level is often used as the primary variable for controlling the tradeoff between bit rate and image quality.

At times, using quantization level alone may be insufficient to meet the bandwidth and quality requirements of a particular application. In such circumstances, it may become necessary to employ more drastic techniques, such as frame skipping, in which one or more frames are dropped from the video sequence. Such frame skipping may be used to sacrifice short-term temporal quality in the decoded video stream in order to maintain a longer-term spatial quality at an acceptable level.

SUMMARY OF THE INVENTION

The present invention is directed to an algorithm for achieving frame-level bit-rate control for video compression processing for applications such as video conferencing in which real-time processing and transmission requirements make such rate control especially important. According to one embodiment, the present invention is a method for controlling bit rate by a machine implementing video compression processing of a video sequence to select a target bit rate for a current frame in the video sequence, comprising the steps of (a) generating a number of bits used to encode a previous M frames in the video sequence, wherein M is a specified number of frames; (b) generating a number of available bits for an unused portion of a multi-frame bit budget corresponding to a specified number of bits available for encoding N frames in the video sequence, wherein N is a specified number of frames and M<N, by subtracting the number of bits used to encode the previous M frames from the multi-frame bit budget; (c) generating the target bit rate for the current frame by dividing the unused portion of the multi-frame bit budget by (N−M); and (d) encoding the current frame based on the target bit rate.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In one embodiment, the present invention is directed to a frame-level rate control and skipping strategy for a real-time video conferencing system that allocates frame-level targets (i.e., allocations of bits) based on scene content, encoder state, and buffer considerations. The algorithm maintains a constant bit rate over a timing window of specified duration (e.g., specified number of consecutive frames), while allowing variations in the target and actual bit rates used to encode individual frames. Through a combination of target bit allocation and frame skipping, spatial and temporal resolutions are maintained within acceptable ranges while meeting buffer delay constraints. The algorithm may be extended to include PB frames in addition to P frames.

Notation

The following notation is used in this specification:

R: Channel transmission rate in bits/sec (e.g., 24000 bits/sec).

Bpp: Bits per picture=R/original_frame_rate (e.g., for an original frame rate of 30 fps and R=24Kbps, Bpp=800 bits per picture).

Bprev: Bits used to encode the previous frame.

fs: Frame skip corresponding to the desired average frame rate (e.g., for input video having 60 fps and a transmission rate of 15 fps, fs=4).

act_buf_size: The actual size of the encoder buffer. This is governed by the picture format.

VBVf_b: Buffer fullness before putting the currently encoded frame bits into buffer.

VBVf_a: Buffer fullness after putting the currently encoded frame bits into buffer.

max_buf_size: The maximum size of the steady state buffer. In one embodiment, this is chosen to be R/2, which means that 0.5 seconds is the upper bound on buffer delay.

ssbs: The desired VBVf_a (steady state buffer size).

S, Sp: Interframe distortion after motion compensation for the current frame and average distortion over a specified number of previous frames, respectively.

Frame Skipping Strategy

In order to meet buffer delay constraints while maintaining the spatial quality within acceptable limits at a given bit rate, frame skipping may be adopted. In one embodiment, the average delay for a frame in the buffer is constrained to be ssbs/R, and the maximum delay is dictated by the accuracy with which the target is met. Usually, it is only marginally larger that ssbs/R. The skip after encoding a picture is computed as follows:

```
Set skip=1, and VBVf_b = VBVf_a - Bpp.
while (VBVf_b + Bf > ssbs) {
    if(VBVf_b - Bpp < 0) break;
    /* this avoids underflow and under-utilization of bits */
    skip++
    VBVf_b = VBVf_b - Bpp
}
```

Bf is the estimate for the next frame to be encoded and is computed as (Bprev+Bpp*fs)/2. Thus, the algorithm attempts to maintain the buffer delay around ssbs/R.

Frame-Level Rate Control for P-Frame-Only Coders

Figure 1:
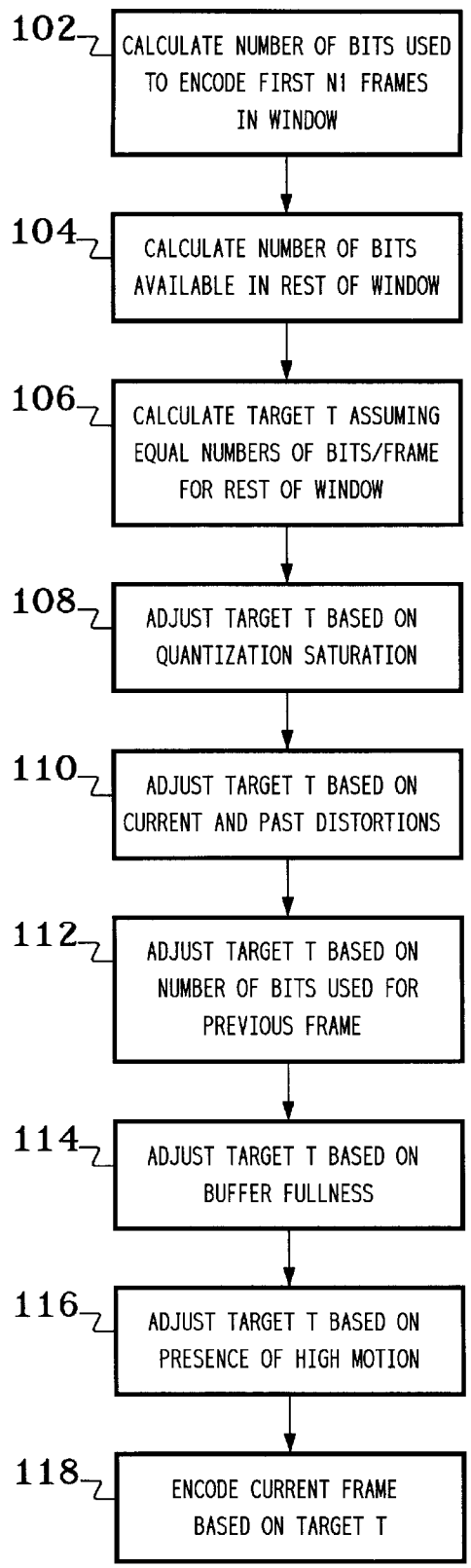
FIG. 1 shows a flow diagram of the processing implemented by a P-frame-only coder to select a target number of bits for encoding the current frame, according to one embodiment of the present invention.

FIG. 1 shows a flow diagram of the processing implemented by a P-frame-only coder to select a target number of bits (T) for encoding the current frame, according to one embodiment of the present invention. The processing depicted in FIG. 1 is described in the following sections.

Target Computation over a Window of Frames

Under the processing of FIG. 1, an attempt is made to maintain a constant bit rate over a window of W frames, centered at the current frame being encoded. For the first N1 frames in the window, the number of bits (B1) used to encode those frames is calculated (step 102 of FIG. 1). The number of frames left to be encoded is N2=(W-N1)/fs, where N1 is the total number of frames processed including those that are skipped. The available number of bits for the whole window is Bw=W*Bpp. The target T for the current frame is T=(Bw-B1)/N2 (steps 104 and 106). This computation comes from the assumption that the same number of bits will be used for each of the remaining frames in the window.

Target Modification

This section describes an algorithm to modify the target T based on the state of the encoder and the scene content. The target is modified based on one or more of the following optional considerations: (a) quantizer saturation, (b) distortion after motion compensation as compared to distortion over the previous frames, (c) bit count for the previous frame, and (d) buffer fullness.

In particular, for quantizer saturation, if the quantizer parameter QP saturated for the previous picture (e.g., mean QP>25, for a system having 31 quantization levels), the current frame target T may be increased (step 108 of FIG. 1) as follows:

$$T=T*(1+\beta*(QP-QP\_thresh))$$

where $\beta$ is a specified factor (e.g., 0.06) and QP_threshold is a specified saturated quantization level (e.g., 25).

While the quantizer parameter is not saturated, the target T may be modified based on current and past distortions (step 110) as follows:

$$T=T*(Sp+k*S)/(k*Sp+S),$$

where S is the motion-compensated distortion (e.g., based on a sum of absolute pixel differences (SAD) measure) for the current frame, Sp is the average motion-compensated distortion over the past M frames (e.g., M=2), and k>1 (e.g., k=4). Sp is preferably a weighted average that emphasizes more recent data.

The target T may also be modified based on the number of bits used for the previous frame (Bprev) (step 112) as follows:

$$T=\alpha*T+(1-\alpha)*Bprev,$$

where $0<=\alpha<=1$ (e.g., $\alpha=0.7$). This step reduces fluctuation in the quality of reference frames, and helps ensure that any degradation over time is graceful.

The target T may also be modified based on buffer fullness (step 114) as follows:

$$T=T*(a+\lambda*b)/(\lambda*a+b),$$

where a=VBVf_b (the buffer fullness before putting the currently encoded frame bits into the buffer), b=ssbs–VBVf_b, and $\lambda>1$. This enables the algorithm to take advantage of the buffer. If VBVf_b is less than half of the desired steady state buffer size (i.e., ssbs/2), then the target is increased; otherwise, the target is decreased.

The resulting target T is then used to encode the frame (step 118), for example, using macroblock adaptation of the QP (quantization parameter) based on the TMN 5 or TMN 8 strategies for the H.263+standard.

High-Motion Exception

In high-motion regions, the above algorithm may lead to loss of spatial quality and the algorithm might take a long time to recover. Thus, in these situations, the algorithm may take advantage of the buffer and choose to boost the target (step 116 in FIG. 1). Furthermore, when the algorithm returns to "steady-state," the algorithm gracefully decreases the frame target to the steady state value (i.e., approximately fs*Bpp). Graceful degradation may be achieved based on a weighted average on the target with the previous bit count Bprev, for example:

$$T=0.8T+0.2Bprev$$

This would enable the algorithm to maintain the spatial quality of the frames even in the presence of abrupt motion, and allows the algorithm to recover faster when the scene motion reduces.

The high-motion detection may be based on a comparison between the current motion-compensated distortion (S) and the weighted average of the previous motion-compensated distortions (Sp). In one embodiment, the target modification is implemented as three linear segments selected to approximate a smooth curve, where:

$T=(1+4*factor)/(4+factor)*T$ for factor<1.05

$T=(1.03+(factor-1.05)/0.3)*T$ for 1.05<factor<1.15

$T=(1.36+4*(factor-1.15))*T$ for factor>1.15 where factor=S/Sp.

Frame-Level Rate Control for Coders using PB or P Frames

The strategy described above was designed to code P frames only. In this section, the strategy is extended to coders with PB frames.

When P and PB frames are mixed, the delays for the P frames are significantly lower than the delay for the B frame of a PB frame (for the same skip). For ease of discussion, it is assumed that the algorithm operates at a constant frame skip fs. In that case, the overall system delay for a typical P-only frame from the moment of capture to availability at the decoder is given as follows:

fs/ref_frame_rate+VBVf_b/R+processing delay+channel delay, while the delay for the B frame of a typical PB frame is given as follows:

3fs/ref_frame_rate+VBVf_b/R+processing delay+channel delay In general, VBVf_b is lower for the PB frame than the P frame, since a PB frame has to wait for the P frame (which is typically 2*fs from the previous reference frame and thus depleting the buffer more) before encoding.

Thus, when P and PB frames are mixed, delays for the P frames are smaller than those for the PB frames. To keep the delays equal, the following guidelines may be adopted:

1. The VBVf_b before encoding a P-only frame is fs*Bpp more than the VBVf_b before encoding a PB frame.
2. Each P frame is delayed by fs*Bpp/R at the decoder before it is displayed.

Figure 2:
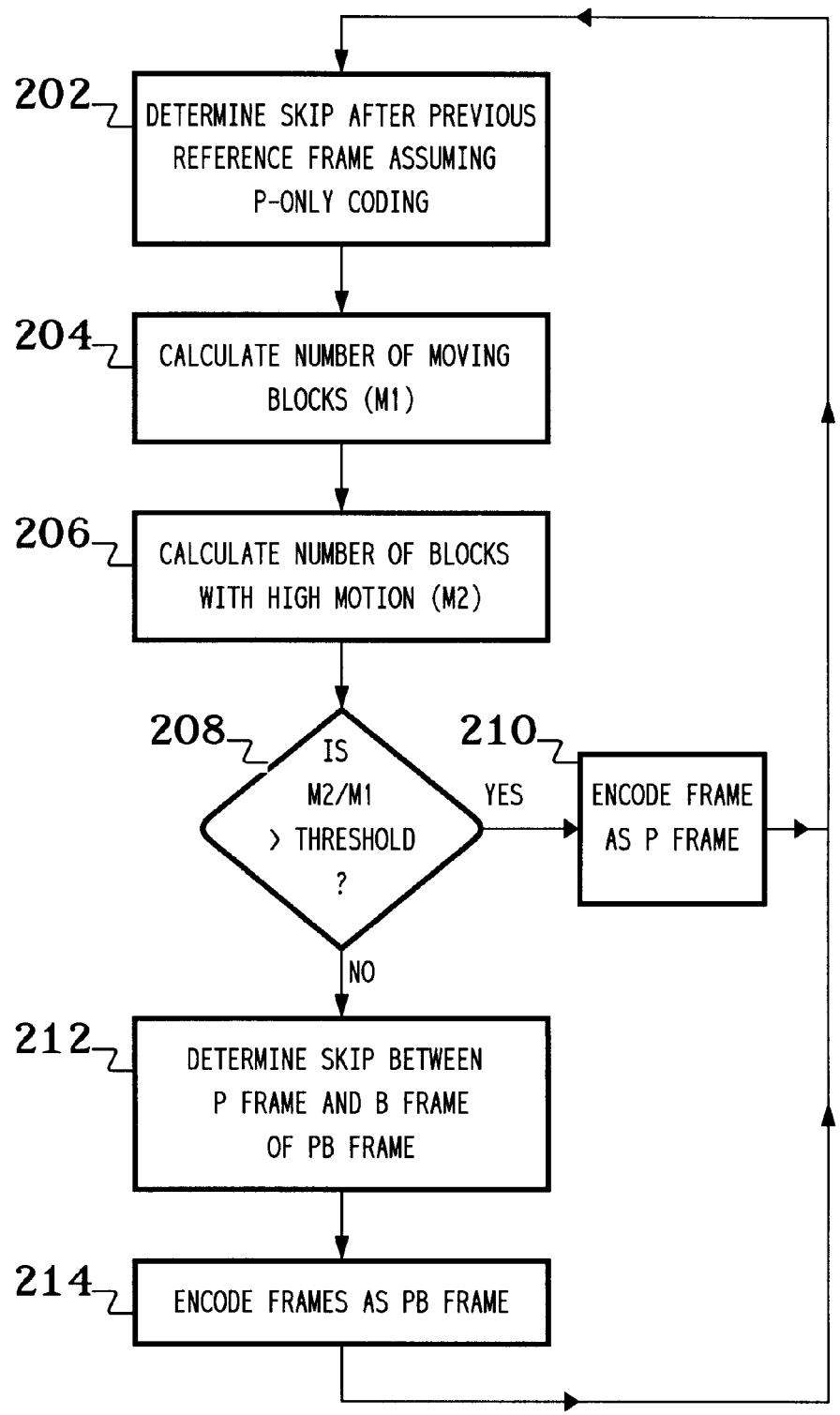
FIG. 2 shows a flow diagram of the processing corresponding to a frame-skipping strategy, according to one embodiment of the present invention.

FIG. 2 shows a flow diagram of the processing corresponding to a frame-skipping strategy based on the above guidelines, according to one embodiment of the present invention. According to this strategy:

1. First, determine the skip after the previous reference frame based on the strategy used in the P-only case (step 202 of FIG. 2). The only difference comes in the case where the previous frame was a PB frame. In that case, the number of bits used to encode the previous frame (Bprev) is twice the number of bits required for one frame, and this is divided by 2 when the number of bits for the current frame is estimated.
2. Then, perform a PB decision to decide whether or not to code the current frame as a P frame. The strategy is based on the observation that H.263 PB frames do not work well for large motion. (This statement is not necessarily true in the improved PB mode). Thus, if large motion is detected (steps 204–208), the decision is made to encode the current frame as a P frame (step 210). One possible high-motion detection algorithm is described in the next section. If the algorithm chooses to encode this frame as a P frame, then the processing returns to step 1 after encoding the P frame.
3. If a PB frame is coded, the algorithm determines the skip between the B frame and the P frame of the PB frame based on the buffer fullness (step 212). Essentially, the algorithm determines the skip as follows:

$VBV\_fullness+max(Bprev, 2*fs*Bpp)<ssbs$

According to this equation, the buffer fullness after encoding the PB-frame should be less than the steady-state-buffer size ssbs. The term max(Bprev, 2*fs*Bpp) is used to estimate the number of bits for the frame. Thus, skip is incremented until the buffer fullness, after encoding, drops below ssbs. Then, encode the PB frame (step 214) and go to step 1.

In the case where high motion is detected between the B and P frames of a PB frame, the PB mode is turned off for this frame and the P frame of the "PB" frame is encoded as a P-only frame. This situation should not occur very often in a sequence.

Motion Detection for the PB decision

The PB decision described previously requires a high-motion detector. This detector may be implemented as follows.

1. Determine the number of blocks that are moving (M1) (step 204 of FIG. 2). This may be determined from the raw frame differences or from the motion-compensated frame differences and the motion field. If motion estimation is performed, M1 refers to the number of blocks having a non-zero motion vector. Otherwise, M1 refers to the number of blocks having a distortion measure greater than some specified threshold level (e.g., SAD>100).
2. Determine the number of blocks that have high motion (M2) (step 206), again based on either the raw frame differences or the motion-compensated frame differences and the motion field. If motion estimation is performed, M2 refers to the number of blocks whose motion vector has a magnitude greater than a specified threshold level. If motion estimation is not used, M2 refers to the number of blocks having a distortion measure greater than some specified high-motion threshold level (e.g., SAD>750).
3. If M2/M1 is greater than a specified threshold level (e.g., 1.15) (step 208), then code the current frame as a P frame (step 210); otherwise, code the current frame as a PB frame (steps 212–214).

SUMMARY AND CONCLUSIONS

The frame-level rate control of the present invention is particularly applicable in real-time very low bit-rate coders. The algorithm can be implemented by coders using only P frames as well as coders using PB-frames, an added functionality when compared to the TMN8 test model for the H.263+standard. The algorithm provides a buffer delay variable, which can be selected by a user to trade delay for graceful change in spatial quality over time. By adapting the target bit allocation for a frame to the scene content, spatial quality is maintained in high-motion areas and quick recovery is made possible after an abrupt motion, while maintaining the buffer delay within desired limits.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What claimed is:

1. A method for controlling bit rate by a machine implementing video compression processing of a video sequence to select a target bit rate for a current frame in the video sequence, comprising the steps of:
   (a) generating a number of bits used to encode a previous M frames in the video sequence, wherein M is a specified number of frames;
   (b) generating a number of available bits for an unused portion of a multi-frame bit budget corresponding to a specified number of bits available for encoding N frames in the video sequence, wherein N is a specified number of frames and M<N, by subtracting the number of bits used to encode the previous M frames from the multi-frame bit budget;
   (c) generating the target bit rate for the current frame by dividing the unused portion of the multi-frame bit budget by (N−M); and
   (d) encoding the current frame based on the target bit rate.

2. The invention of claim 1, wherein step (c) comprises the further step of adjusting the target bit rate based on presence of quantizer saturation.

3. The invention of claim 2, wherein step (c) comprises the step of increasing the target bit rate if a quantizer parameter for a previous frame was greater than a specified threshold level.

4. The invention of claim 1, wherein step (c) comprises the further step of adjusting the target bit rate based on current and past distortion levels.

5. The invention of claim 4, wherein step (c) comprises the step of adjusting the target bit rate T as follows:

$$T = T*(Sp+k*S)/(k*Sp+S),$$

where S is a motion-compensated distortion level for the current frame, Sp is an average motion-compensated distortion over a previous number of frames, and k is a specified parameter >1.

6. The invention of claim 5, wherein Sp is a weighted average that emphasizes more recent frames.

7. The invention of claim 1, wherein step (c) comprises the further step of adjusting the target bit rate based on the number of bits used to encode a previous frame.

8. The invention of claim 7, wherein step (c) comprises the step of adjusting the target bit rate T as follows:

$$T = \alpha*T+(1-\alpha)*Bprev,$$

where Bprev is the number of bits used to encode the previous frame and $\alpha$ is a specified parameter such that $0 <= \alpha <= 1$.

9. The invention of claim 1, wherein step (c) comprises the further step of adjusting the target bit rate based on buffer fullness.

10. The invention of claim 9, wherein step (c) comprises the step of adjusting the target bit rate T as follows:

$$T = T*(a+\lambda*b)/(\lambda*a+b),$$

where a is a parameter equal to the buffer fullness before putting currently encoded frame bits into the buffer, b is a parameter equal to ssbs-a, where ssbs is a parameter equal to a steady state buffer size, and $\lambda$ is a specified parameter >1.

11. The invention of claim 1, wherein step (c) comprises the further step of adjusting the target bit rate based on a characterization of motion.

12. The invention of claim 11, wherein step (c) comprises the step of adjusting the target bit rate as a function of S/Sp, where S is a parameter equal to a motion-compensated distortion level for the current frame and Sp is a parameter equal to an average motion-compensated distortion level over a previous number of frames.

13. The invention of claim 12, wherein the function is implemented as a plurality of linear segments relating S/Sp to a factor used to adjust the target bit rate.

14. The invention of claim 1, wherein step (c) further comprises the steps of:
   (1) adjusting the target bit rate based on presence of quantizer saturation;
   (2) adjusting the target bit rate based on current and past distortion levels;
   (3) adjusting the target bit rate based on the number of bits used to encode a previous frame;
   (4) adjusting the target bit rate based on buffer fullness; and
   (5) adjusting the target bit rate based on a characterization of motion.

15. The invention of claim 14, wherein:
   step (c)(1) comprises the step of increasing the target bit rate if a quantizer parameter for a previous frame was greater than a specified threshold level;
   step (c)(2) comprises the step of adjusting the target bit rate T as follows:

$$T = T*(Sp+k*S)/(k*Sp+S),$$

where S is a motion-compensated distortion level for the current frame, Sp is a weighted average motion-compensated distortion over a previous number of frames, and k is a specified parameter >1;

step (c)(3) comprises the step of adjusting the target bit rate T as follows:

$$T = \alpha*T+(1-\alpha)*Bprev,$$

where Bprev is the number of bits used to encode the previous frame and $\alpha$ is a specified parameter such that $0 <= \alpha <= 1$;

step (c)(4) comprises the step of adjusting the target bit rate T as follows:

$$T = T*(a+\lambda*b)/(\lambda*a+b),$$

where a is a parameter equal to the buffer fullness before putting currently encoded frame bits into the buffer, b is a parameter equal to ssbs-a, where ssbs is a parameter equal to a steady state buffer size, and $\lambda$ is a specified parameter >1; and step (c)(5) comprises the step of adjusting the target bit rate as a function of S/Sp, where S is a parameter equal to a motion-compensated distortion level for the current frame and Sp is a parameter equal to an average motion-compensated distortion level over a previous number of frames, wherein the function is implemented as a plurality of linear segments relating S/Sp to a factor used to adjust the target bit rate.

16. A computer-readable medium having stored thereon a plurality of instructions, the plurality of instructions including instructions which, when executed by a processor, cause the processor to implement a method for processing image data, the method comprising the steps of:

(a) generating a number of bits used to encode a previous M frames in the video sequence, wherein M is a specified number of frames;

(b) generating a number of available bits for an unused portion of a multi-frame bit budget corresponding to a specified number of bits available for encoding N frames in the video sequence, wherein N is a specified number of frames and M<N, by subtracting the number of bits used to encode the previous M frames from the multi-frame bit budget;

(c) generating the target bit rate for the current frame by dividing the unused portion of the multi-frame bit budget by (N−M); and (d) encoding the current frame based on the target bit rate.

17. The invention of claim 16, wherein step (c) comprises the further step of adjusting the target bit rate based on presence of quantizer saturation.

18. The invention of claim 16, wherein step (c) comprises the further step of adjusting the target bit rate based on current and past distortion levels.

19. The invention of claim 16, wherein step (c) comprises the further step of adjusting the target bit rate based on the number of bits used to encode a previous frame.

20. The invention of claim 16, wherein step (c) comprises the further step of adjusting the target bit rate based on buffer fullness.

21. The invention of claim 16, wherein step (c) comprises the further step of adjusting the target bit rate based on a characterization of motion.

22. The invention of claim 16, wherein step (c) further comprises the steps of:

(1) adjusting the target bit rate based on presence of quantizer saturation;

(2) adjusting the target bit rate based on current and past distortion levels;

(3) adjusting the target bit rate based on the number of bits used to encode a previous frame;

(4) adjusting the target bit rate based on buffer fullness; and (5) adjusting the target bit rate based on a characterization of motion.

* * * * *